United States Patent
Yoon et al.

(10) Patent No.: US 12,279,336 B2
(45) Date of Patent: Apr. 15, 2025

(54) METHOD AND APPARATUS FOR IDENTIFYING PROFILE DELETION WHEN eUICC TERMINAL IS CHANGED

(71) Applicant: Samsung Electronics Co., Ltd., Suwon-si (KR)

(72) Inventors: Kangjin Yoon, Suwon-si (KR); Duckey Lee, Suwon-si (KR); Sujung Kang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 303 days.

(21) Appl. No.: 17/662,817

(22) Filed: May 10, 2022

(65) Prior Publication Data
US 2022/0369096 A1  Nov. 17, 2022

(30) Foreign Application Priority Data

May 11, 2021 (KR) .................. 10-2021-0060469
Nov. 1, 2021 (KR) .................. 10-2021-0148071

(51) Int. Cl.
*H04W 8/18* (2009.01)
(52) U.S. Cl.
CPC .................. *H04W 8/183* (2013.01)
(58) Field of Classification Search
None
See application file for complete search history.

(56) References Cited

U.S. PATENT DOCUMENTS

| | | |
|---|---|---|
| 9,009,475 B2 | 4/2015 | Hauck et al. |
| 10,764,745 B2 | 9/2020 | Li et al. |
| 2014/0115072 A1* | 4/2014 | Welcher .................. H04L 51/18 709/206 |

(Continued)

FOREIGN PATENT DOCUMENTS

| | | |
|---|---|---|
| KR | 10-2020-0110101 A | 9/2020 |
| WO | 2019/201474 A1 | 10/2019 |

(Continued)

OTHER PUBLICATIONS

Supplementary European Search Report dated Jul. 10, 2024, in connection with European Application No. 22807792.1, 12 pages.

(Continued)

*Primary Examiner* — Frantz Bataille

(57) ABSTRACT

The disclosure relates to a method and apparatus for reinstalling a profile at the time of changing an eUICC terminal. A terminal for managing a profile for network connection by using an eUICC in a wireless communication system includes a transceiver and at least one processor configured to control the terminal to receive a request for profile transfer from a user, identify profile transfer information, transmit a message requesting an activation code to a profile server, receive, from the profile server, the activation code and information indicating whether a profile deletion is required, delete the profile, transmit a deletion result of the profile to the profile server, transmit the activation code to another terminal, receive the activation code from the other terminal, transmit a message requesting a profile to the profile server by using the activation code, receive a profile package from the profile server, and install the profile package.

20 Claims, 6 Drawing Sheets

(56) References Cited

U.S. PATENT DOCUMENTS

| | | |
|---|---|---|
| 2019/0268765 A1* | 8/2019 | Park .................... H04W 12/10 |
| 2019/0324735 A1 | 10/2019 | Park |
| 2020/0252788 A1 | 8/2020 | Lou et al. |
| 2021/0112402 A1 | 4/2021 | Ullah et al. |

FOREIGN PATENT DOCUMENTS

| | | |
|---|---|---|
| WO | 2020184995 A1 | 9/2020 |
| WO | 2021/066569 A1 | 4/2021 |

OTHER PUBLICATIONS

International Search Report and Written Opinion of the International Searching Authority dated Aug. 12, 2022 in connection with International Patent Application No. PCT/KR2022/006667, 8 pages.

* cited by examiner

METHOD AND APPARATUS FOR IDENTIFYING PROFILE DELETION WHEN eUICC TERMINAL IS CHANGED

CROSS-REFERENCE TO RELATED APPLICATIONS

This application is based on and claims priority under 35 U.S.C. § 119 to Korean Patent Application No. 10-2021-0060469, filed on May 11, 2021, in the Korean Intellectual Property Office, and Korean Patent Application No. 10-2021-0148071 filed on Nov. 1, 2021, in the Korean Intellectual Property Office, the disclosures of which are herein incorporated by reference in their entirety.

BACKGROUND

1. Field

The present disclosure relates to a method and an apparatus for installing and managing an eUICC profile.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

With the advance of wireless communication systems as described above, various services can be provided, and accordingly there is a need for schemes to effectively provide these services.

A "universal integrated circuit card (UICC)" is a smart card used after being inserted into a mobile communication terminal or the like, and is also referred to as a UICC card. The UICC may include an access control module used by the terminal to access a network of a mobile communication operator. Examples of the access control module include a universal subscriber identity module (USIM), a subscriber identity module (SIM), an internet protocol (IP) multimedia service identity module (SIM), and the like. A UICC including a USIM is commonly referred to as a USIM card. Similarly, a UICC including a SIM module is commonly referred to as a SIM card.

Among the UICC cards, a UICC used after being fixed to a terminal is referred to as an eUICC (embedded UICC). The eUICC commonly refers to a UICC card which is used after being fixed to a terminal such that a SIM module can be remotely downloaded and selected. In addition, downloaded SIM module information is also referred to an eUICC profile as a whole, or further simply referred to as a profile.

The above information is presented as background information only to assist with an understanding of the disclosure. No determination has been made, and no assertion is made, as to whether any of the above might be applicable as prior art with regard to the disclosure.

SUMMARY

It is an aspect of the disclosure to provide a service effectively in a mobile communication system.

An embodiment disclosed herein may provide a method and an apparatus for enabling a terminal to select a communication service in a communication system, thereby connecting to a network.

An embodiment disclosed herein may provide a method and an apparatus for enabling a terminal to online download a profile for connecting to a network, and to install and manage the profile in a communication system.

An embodiment disclosed herein may provide a method and an apparatus wherein a profile installed by a terminal to connect to a network in a communication system can be efficiently downloaded again to another terminal.

In order to solve the above-mentioned problems, a method performed by a first device in a communication system may include identifying a selection for a profile to operate device chance; transmitting, to a server, a first message for requesting the device change including an integrated circuit card identifier (ICCID) of the profile; and receiving, from the server, a response message for the first message including an activation code for the profile, information indicating to delete the profile, information notifying that a delete notification is supported, and information on an address of a receiver that processes the delete notification.

A method performed by a server in a communication system may include receiving, from a first device, a first message for requesting device change including an integrated circuit card identifier (ICCID) of a profile; and transmitting, to the first device, a response message for the first message based on the ICCID, wherein the response message includes an activation code for the profile, information indicating to delete the profile, information notifying that a delete notification is supported, and information on an address of a receiver that processes the delete notification.

A method of a second device in a communication system may include receiving, from a first device, an activation code including information on a matching identifier (ID) for a profile and a part of a delete notification for the profile; transmitting, to a server, the information on the matching ID; and receiving, from the server, the profile based on the information on the matching ID, wherein the activation code is included in a message for device change which is transmitted from the server to the first device, and wherein the message further includes information indicating to delete the profile, information notifying that the delete notification is supported, and information on an address of a receiver that processes the delete notification.

A first device in a communication system may include a transceiver; and a controller configured to: identify a selection for a profile to operate device chance; control the transceiver to transmit, to a server, a first message for requesting the device change including an integrated circuit card identifier (ICCID) of the profile, and control the transceiver to receive, from the server, a response message for the first message including an activation code for the profile, information indicating to delete the profile, information notifying that a delete notification is supported, and information on an address of a receiver that processes the delete notification.

A server in a communication system may include a transceiver; and a controller configured to: control the transceiver to receive, from a first device, a first message for requesting device change including an integrated circuit card identifier (ICCID) of a profile, and control the transceiver to transmit, to the first device, a response message for the first message based on the ICCID, wherein the response message includes an activation code for the profile, information indicating to delete the profile, information notifying that a delete notification is supported, and information on an address of a receiver that processes the delete notification.

A second device in a communication system may include a transceiver; and a controller configured to: control the transceiver to receive, from a first device, an activation code including information on a matching identifier (ID) for a profile and a part of a delete notification for the profile, control the transceiver to transmit, to a server, the information on the matching ID, and control the transceiver to receive, from the server, the profile based on the information on the matching ID, wherein the activation code is included in a message for device change which is transmitted from the server to the first device, and wherein the message further includes information indicating to delete the profile, information notifying that the delete notification is supported, and information on an address of a receiver that processes the delete notification.

In addition, a terminal for managing a profile for network connection by using an eUICC (embedded universal integrated circuit card) in a wireless communication system according to an embodiment may include a transceiver; and at least one processor configured to control the terminal to receive a request for transferring the profile from a user, identify profile transfer information, transmit a message requesting an activation code to a profile server, receive, from the profile server, the activation code, information indicating whether profile deletion is required and whether a profile deletion result can be selectively delivered through another terminal, and a profile deletion result processing address, delete the profile, transmit the profile deletion result to the profile server, combine an activation code selectively delivered from the server with all or part of the profile deletion result so as to couple the activation code, deliver the activation code to another terminal, receives the activation code delivered from another terminal, transmits a profile request message to the profile server by using the activation code, selectively further include the profile deletion result in the profile request message, receive a profile package from the profile server, and install the profile package.

A profile server for providing a profile for network connection to a terminal in a wireless communication system according to an embodiment may include a transceiver; and at least one processor configured to control the profile server to receive a message requesting transfer of the profile from the terminal, determine whether the profile can be transferred, generate an activation code such that the profile or a new profile can be downloaded, configure the state of the profile to be a state in which the same cannot be downloaded when the profile can be transferred, configured the state of the new profile to be a state in which the same can be downloaded when the profile cannot be transferred, transmit, to the terminal, the activation code and a message including information indicating whether the profile needs to be deleted and whether a profile deletion result selectively delivered through another terminal can be processed and a profile deletion result processing address, receive the profile deletion result from the terminal, change the profile to a downloadable state, receive a profile download request message from the terminal, determine whether the profile is in an downloadable state, transmit a profile package to the terminal when the profile is in an downloadable state, transmit an error code or verify the profile deletion result included in the profile download request when the profile is in a non-downloadable state, and transmit an error code when the profile deletion result does not exist of when the verification fails.

According to an embodiment of the disclosure, a service may be effectively provided in a mobile communication system.

According to an embodiment of the disclosure, when a terminal in a communication system needs to reinstall a profile installed in the terminal to another terminal, an activation code necessary to reinstall the profile may be reissued by a profile server, or the activation code necessary to reinstall the profile may be extracted from information stored in the terminal or the profile. If necessary, the terminal may first delete a profile to be transferred and may deliver a profile deletion proof to the server such that deletion of the profile can be proven. If necessary, the terminal may include the profile deletion proof in an activation code and may deliver the activation code to another terminal such that the other terminal can effectively download and install a profile from the profile server.

According to an embodiment of the disclosure, when a profiler server in a communication system receives from a terminal a request for reinstalling a profile installed in the terminal to another terminal, the profile server configures the profile in a non-downloadable state when the profile can be reused, thereby requesting the terminal to delete the profile. If necessary, the server request delivery of a profile deletion proof. When the profile cannot be reused, the server configures another profile in a downloadable state such that the same is prepared. The server generates an activation code by which the prepared profile can be downloaded. When the terminal has deleted the profile, the server changes the profile to a downloadable state such that profile download can be safely processed while preventing the profile from being copied.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
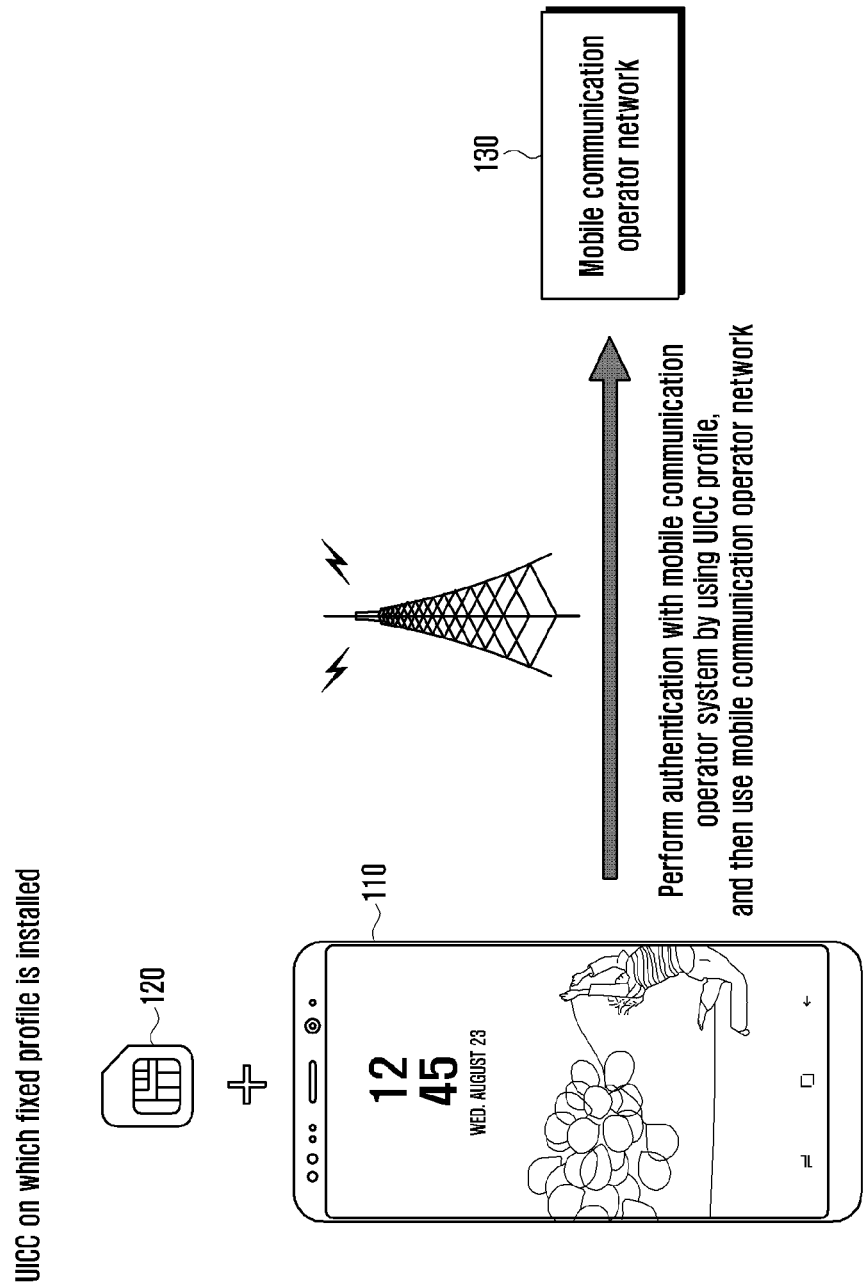
FIG. 1 illustrates a method of a terminal for connecting to a mobile communication network by using a universal integrated circuit card (UICC) on which a fixed profile is installed according to an embodiment of the present disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card.

The specific terms used in the following description are provided to help understanding of the disclosure, and such specific terms may be changed into other forms without departing from the spirit and scope of the disclosure.

In the present disclosure, a "universal integrated circuit card (UICC)" is a smart card inserted and used in a mobile communication terminal, and is also referred to as a UICC card.

A UICC refers to a chip in which personal information of a mobile communication subscriber, such as network access authentication information, a phone number list, and a short message service (SMS) is stored, and which performs subscriber authentication and traffic security key generation when access is made to a mobile communication network, such as global system/standard for mobile communication (GSM), wideband code division multiple access (WCDMA), long-term evolution (LTE), etc., thereby making it possible to stably use mobile communication.

The UICC may include a communication application or access control module which allows a terminal to access the network of a mobile communication operator. The communication application or access control module includes a universal subscriber identity module (USIM), a subscriber identity module (SIM), an IP multimedia service identity module (ISIM), etc., for example. In addition, the UICC may provide a higher level security function for loading various applications, such as an electronic wallet, ticketing, an electronic passport, etc.

The UICC including USIM is usually also referred to as a USIM card. Similarly, the UICC including the SIM module is also referred to as a SIM card.

The terms "SIM card," "UICC card," "USIM card," and "UICC in which ISIM is included" in the disclosure may be used as the same meaning herein. That is, the contents of the disclosure may be equally applied to the SIM card, the USIM card, the ISIM card, or the general UICC card.

The SIM card stores personal information of a mobile communication subscriber, and performs subscriber authentication and traffic security key generation during access to a mobile communication network, thereby enabling stable use of mobile communication.

Generally, the SIM card is manufactured as a dedicated card for a specific mobile communication operator by a request of the specific mobile communication operator, and is released in a state where authentication information for accessing the network of the corresponding operator, for example, a universal subscriber identity module (USIM) application and an international mobile subscriber identity (IMSI), a K value, an OPc value, or the like, is previously installed in the card. Therefore, the SIM card is transmitted to the corresponding mobile communication operator, and then the corresponding mobile communication operator provides the same to a subscriber. Thereafter, if necessary, the corresponding mobile communication operator may perform management of applications in the UICC, including installation, modification, and deletion of the applications, by using an over the air (OTA) technology. The subscriber can use the network of the corresponding mobile communication operator and application services by inserting the UICC card into his/her own mobile communication terminal, and when replacing the terminal with a new one, can use the authentication information, the mobile communication phone number, the personal phonebook, and the like stored in the UICC card, as they are in the new terminal by taking out the UICC card from the old terminal and inserting the same into the new terminal.

However, the SIM card causes inconvenience to a mobile communication terminal user when the mobile communication terminal user is provided with a service from other mobile communication operators. The mobile communication terminal user has inconvenience of physically obtaining a SIM card in order to receive the service from the mobile communication operator. For example, when a user travels abroad, the user has to purchase a local SIM card in order to receive a local mobile communication service, which causes inconvenience to the user. A roaming service may somewhat reduce the inconvenience, but there is a problem in that the user needs to pay a high rate for the roaming service and cannot receive the service in a case in which a contract is not established between mobile communication operators.

This inconvenience may be mostly solved by remotely downloading and installing the SIM module in a UICC card. That is, the SIM module for a mobile communication service to be used may be downloaded to the UICC card at a timepoint desired by a user. Multiple SIM modules may be downloaded and installed in the UICC card, and only one of the SIM modules may be selected and used. The UICC card may be fixed or may not be fixed in a terminal. In particular, the UICC fixed in a terminal is referred to as an embedded UICC (eUICC). Typically, the eUICC may refer to a UICC card that is fixed in a terminal and is capable of remotely downloading a SIM module and selecting the SIM module. In the disclosure, the UICC card capable of remotely downloading the SIM module and selecting the SIM module may be referred to as the eUICC. That is, UICC cards, which are fixed or not fixed in a terminal, among the UICC cards capable of remotely downloading and selecting the SIM module, are collectively referred to as the eUICC. In addition, SIM module information that is downloaded may be collectively referred to as an eUICC profile, or more simply as a profile.

In the disclosure, an "embedded UICC (eUICC)" may be a security module in a form of a chip embedded in a terminal, rather than a detachable security module that can be inserted into and detached from a terminal. The eUICC may download and install a profile by using an over the air (OTA) technology. The eUICC may be referred to as a UICC capable of downloading and installing a profile.

In the disclosure, a method of downloading and installing a profile to an eUICC by using the OTA technology may also be applied to a detachable UICC that can be inserted into and detached from a terminal. That is, embodiments of the disclosure may be applied to a UICC capable of downloading and installing a profile by using the OTA technology.

In the disclosure, the term "UICC" may be used interchangeably with the term "SIM," and the term "eUICC" may be used interchangeably with the term "eSIM."

In the disclosure, a "profile" may refer to a thing in which an application, a file system, an authentication key, etc., to be stored in a UICC are packaged in a software format.

In the disclosure, a "USIM profile" may have the same meaning as a "profile," or may refer to a thing in which information included in a USIM application in a profile is packaged in a software format.

In the disclosure, an operation of enabling a profile by a terminal may refer to an operation in which a terminal is configured to receive a communication service through a communication provider who has provided a corresponding profile by changing the state of the profile to "enabled." The profile of the enabled state may be expressed as an "enabled profile."

In the disclosure, an operation of disabling a profile by a terminal may refer to an operation in which the terminal is configured not to receive a communication service through a communication provider provided by the corresponding profile by changing the state of the corresponding profile to "disabled." The profile of the disabled state may be expressed as a "disabled profile."

In the disclosure, an operation of deleting a profile by a terminal may refer to an operation in which the terminal is configured to no longer enable or disable the corresponding profile by changing the state of the corresponding profile to "deleted." The profile of the deleted may be expressed as a "deleted profile."

In the disclosure, an operation of enabling, disabling, or deleting a profile by a terminal may refer to an operation in which, instead of immediately changing the state of each profile to "enabled," "disabled," or "deleted," the terminal may only first make a marking of "to be enabled," "to be disabled," or "to be deleted" with regard to each profile, the terminal or the UICC of the terminal performs a specific operation (e.g., performing a "refresh" or "reset" command) and then changes each profile to "enabled," "disabled," or "deleted." The operation of making a marking of a scheduled state (i.e., "to be enabled," "to be disabled," or "to be deleted") regarding a specific profile is not limited to marking one scheduled state with regard to one profile, it is possible to mark one or more profiles with identical or different scheduled states, to mark one profile with one or more scheduled states, or to mark one or more profiles with identical or different one or more scheduled states.

When the terminal marks a random profile with one or more scheduled states, the two scheduled state marks may also be integrated into one. For example, when a random profile is marked with "to be disabled" and "to be deleted," the corresponding profile may be integrally marked with "to be disabled and deleted."

Further, an operation in which a terminal marks one or more profiles with a schedule state may be performed successively or simultaneously. In addition, an operation in which a terminal marks one or more profiles with a scheduled state and then changes the actual state of the profiles may be performed successively or simultaneously.

In the disclosure, a "profile provisioning server" may include a function of generating a profile, encrypting the generated profile, generating a profile remote management command, or encrypting the generated profile remote management command. The profile provisioning server may be expressed as subscription manager data preparation (SM-DP), subscription manager data specification plus (SM-DP+), an off-card entity of profile domain, a profile encryption server, a profile generating server, a profile provisioner (PP), a profile provider, and a profile provisioning credentials holder (PPC holder).

In the disclosure, a "profile management server" may include a function of managing a profile. The profile management server may be expressed as subscription manager secure routing (SM-SR), subscription manager secure routing plus (SM-SR+), an off-card entity of eUICC profile manager or profile management credentials holder (PMC holder), an eUICC manager (EM), a profile manager (PP), and the like.

In the disclosure, the profile provisioning server may refer to a combination of the functions of the profile management server. Thus, in various embodiments of the disclosure, the operation of the profile provisioning server may be performed in a profile management server. Similarly, the operation of the profile management server or SM-SR may be performed in the profile providing server.

In the disclosure, an "opening/mediation server" may be expressed as a subscription manager discovery service (SM-DS), a discovery service (DS), a root SM-DS, or an alternative SM-DS. The opening/mediation server may receive a register event request or an event register request from one or more profile provisioning servers or opening/mediation servers. In addition, one or more opening/medication servers may be used in combination, and the first opening/mediation server in this case may receive an event register request not only from the profile provisioning server, but also from the second opening/mediation server.

In the disclosure, a profile provisioning server and an opening/mediation server may be commonly referred to as a "remote SIM provisioning (RSP) server." The RSP server may be expressed as a subscription manager XX (SM-XX).

In the disclosure, the term "terminal" may be referred to as a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a moving node, a mobile, or other terms. In an embodiment, a terminal may include a cellular phone, a smart phone having a wireless communication function, a personal digital assistant (PDA) having a wireless communication function, a wireless modem, a portable computer having a wireless communication function, a photographing device, such as a digital camera, having a wireless communication function, a gaming device having a wireless communication function, a home appliance for storing and reproducing music that has a wireless communication function, an Internet home appliance capable of performing wireless Internet access and browsing, and portable units or terminals having integrated combinations of the functions thereof. Furthermore, a terminal may include a machine to machine (M2M) terminal and a machine type communication (MTC) terminal/device, but is not limited thereto. In the disclosure, a terminal may also be referred to as an electronic device.

In the disclosure, an "electronic device" may have a UICC embedded therein such that a profile can be downloaded and installed therein. When the electronic device has no embedded UICC, a UICC physically separated from the electronic device may be inserted into the electronic device and connected thereto. For example, the UICC may be inserted into the electronic device in a card type. The electronic device may include a terminal, and the terminal may include a UICC configured such that a profile can be downloaded and installed therein. Not only the UICC may be embedded in the terminal, but also the UICC, when separated from the terminal, may be inserted therein, and may be inserted and connected to the terminal. A UICC configured such that a profile can be downloaded and installed therein may be referred to as an eUICC, for example.

In the disclosure, a terminal or an electronic device may include software or an application installed in the terminal or the electronic device so as to control the UICC or the eUICC. The software or application installed in the terminal or the electronic device so as to control the UICC or the eUICC may be referred to as a local profile assistant (LPA), for example.

In the disclosure, "profile delimiter" may be referred to as a profile ID, an integrated circuit card ID (ICCID), a matching ID, an event ID, an activation code, an activation code token, a command code, a command code token, a signed command code, an unsigned command code, or a factor matching with an ISD-P or a profile domain (PD). The profile ID may indicate the unique ID of each profile. The profile delimiter may include the address of a profile provisioning server (SM-DP+) capable of indexing the profile. In addition, the profile delimiter may further include a signature of the profile provisioning server (SM-DP+).

In the disclosure, an eUICC ID may be a unique ID embedded in a terminal, and may be referred to as an EID. In addition, when the eUICC has a provisioning profile preloaded therein, the eUICC ID may be the profile ID of the provisioning profile. Further, an embodiment of the disclosure, when the terminal and the eUICC chip are not separated, the eUICC ID may be the terminal ID. In addition, the eUICC ID may refer to a specific secure domain of the eUICC chip.

In the disclosure, a "profile container" may be referred to as a profile domain. The profile container may be a security domain.

In the disclosure, an "application protocol data unit (APDU)" may be a message used by a terminal to interwork with an eUICC. In addition, the APDU may be a message used by a profile provider (PP) or a profile manager (PM) to interwork with an eUICC.

In the disclosure, "profile provisioning credentials (PPC)" may be a means used for mutual authentication, profile encryption, and signing between a profile provisioning server and an eUICC. The PPC may include at least one of a symmetric key, a Rivest-Shamir-Adleman (RSA) certificate and a personal key, an elliptic curved cryptography (ECC) certificate and a person key, a root certification authority (root CA), and a certificate chain. In addition, when there are multiple profile provisioning servers, different PPCs may be stored or used in the eUICC with regard to the multiple profile provisioning servers.

In the disclosure, "profile management credentials (PMC)" may be a means used for mutual authentication, transmission data encryption, and signing between a profile management server and an eUICC. The PMC may include at least one of a symmetric key, an RSA certificate and a personal key, an ECC certificate and a person key, a root CA, and a certificate chain. In addition, when there are multiple profile management servers, different PMCs may be stored or used in the eUICC with regard to the multiple profile management servers.

In the disclosure, an "AID" may be an application identifier. This value may be a delimiter distinguishing different applications inside the eUICC.

In the disclosure, the term "event" may collectively refer to profile download, remote profile management, or other instructions for managing/handing a profile or an eUICC. An event may be referred to as a remote SIM provisioning operation (or RSP operation) or an event record. Each event may be referred to as data including at least one of an event identifier (event ID or eventID) corresponding thereto, a matching identifier (matching ID or matchingID), the address (frequently qualified domain name (FQDN), IP address, or uniform resource locator (URL)) of a profile provisioning server (SM-DP+) or opening/mediation server (SM-DS) in which the event is stored, the signature of a profile provisioning server (SM-DP+) or opening/mediation server (SM-DS), and the digital certificate of a profile provisioning server (SM-DP+) or opening/mediation server (SM-DS).

Data corresponding to an event may be referred to as a "command code." Some or all of the procedures using the command code may be referred to as a "command code processing procedure," "command code procedure," or "local profile assistant application programming interface (LPA API)." The profile download may be interchangeably used with profile installation.

In addition, the term "event type" may be used to indicate whether a specific event is profile download, remote profile management (e.g., deleting, enabling, disabling, replacing, or updating), or another command for managing/handing a profile or an eUICC. An event type may be referred to as an operation type (or operationtype), an operation class (or operationclass), an event request type, an event class, or an event request class. An event identifier (EventID or MatchingID) may designate a path or usage purpose (EventID Source or MatchingID Source) from which the terminal obtained the corresponding event identifier (EventID or MatchingID) may be designated.

In the disclosure, the term "profile package" may be used interchangeably with a profile or used to denote the data object of a specific profile, and may be referred to as a profile TLV or a profile package TLV. If a profile package is encrypted by using an encryption parameter, the same may be referred to as a protected profile package (PPP) or a protected profile package TLV (PPP TLV). When a profile package is encrypted by using an encryption parameter that can be decrypted only by a specific eUICC, the same may be referred to as a bound profile package (BPP) or a bound profile package TLV (BPP TLV). A profile package TLV may be a data set expressing information constituting the profile in a tag/length/value (TLV) format.

In the disclosure, "local profile management (LPM)" may be referred to as profile local management, local management, local management command, local command, local profile management package (LPM package), profile local management package, local management package, local management command package, or local command package. The LPM may be used in order to change the state of a specific profile (enabled, disabled, or deleted) through software or the like installed in a terminal, or to update the content of a specific profile (e.g., the profile nickname or profile metadata). The LPM may include one or more local management commands, and the profile that is the target of each local management command in this case may be identical or different with regard to each local management command.

In the disclosure, "remote profile management (RPM)" may be referred to as profile remote management, remote management, remote management command, remote command, RPM package, profile remote management package, remote management package, remote management command package, or remote command package. The RPM may be used in order to change the state of a specific profile (enabled, disabled, or deleted) or to update the content of a specific profile (e.g., the profile nickname or profile metadata). The RPM may include one or more remote management commands, and the profile that is the target of each remote management command in this case may be identical or different with regard to each remote management command.

In the disclosure, "certificate" or "digital certificate" may indicate a digital certificate used for mutual authentication based on an asymmetric key including a pair of a public key (PK) and a secret key (SK). Each certificate may include one public key (PK) or one or more PKs, a public key identifier (PKID) corresponding to each public key, the ID of the certificate issuer (CI) who has issued the corresponding certificate (certificate issuer ID), and a digital signature.

In addition, the "certificate issuer" may be referred to as a certification issuer, a certificate authority (CA), or a certification authority.

In the disclosure, "public key (PK)" and "public key identifier (PKID)" may be used interchangeably with a specific public key or a certificate including the public key, a part of a specific public key or a part of a certificate including the public key, an operation result (e.g., hash value) of a specific public key or an operation result (e.g., has value) of a certificate including the public key, or an operation result (e.g., hash value) of a part of a specific public key or an operation result (e.g., hash value) of a part of a certificate including the public key, or a storage in which data is stored.

In the disclosure, when certificates issued by a certificate issuer (primary certificates) are used to issue another certificate (secondary certificate), or if secondary certificates are used to issue tertiary or higher-order certificates in an interlinked manner, the correlation between the certificates may be referred to as a certificate chain or a certificate hierarchy. The CI certificate used to issue the initial certificate may be referred to as a root of certificate, the topmost certificate, a root CI, a root CI certificate, a root CA, a root CA certificate, or the like.

In the disclosure, a "mobile operator" may refer to a business corporation for providing terminals with a communication service, and may be used in a comprehensive manner to denote a business supporting system (BSS) of the mobile operator, an operational supporting system (OSS), point of sale (POS) terminals, and other IT systems. In addition, in the disclosure, the mobile operator is not limited to a specific business corporation for providing a communication service, but may be used to denote a group or association (or consortium) of one or more business corporations, or the representative of the group or association. In addition, the mobile operator may also be referred to as an operator (OP or Op.), a mobile network operator (MNO), a mobile virtual network operator (MVNO), a service provider (SP), or a profile owner (PO), and each mobile operator may have at least one name and/or object identifier (OI) configured or assigned thereto. If a mobile operator refers to a group, an association, or a representative of one or more business corporations, the name or OID of a predetermined group, association, or representative may be the name or OID shared by all business corporations belonging to the group or association, or by all businesses cooperating with the corresponding representative.

In the disclosure, "AKA" may refer to authentication and key agreement, and may indicate an authentication algorithm for accessing 3GPP and 3GPP2 networks.

In the disclosure, "K" (of K value) may refer to an encryption key stored in an eUICC used for the AKA authentication algorithm.

In the disclosure, "OPc" may be a parameter value that can be stored in an eUICC used for the AKA authentication algorithm.

In the disclosure, "NAA" may refer to a network access application program, such as USIM or ISIM, stored in a UICC so as to access a network. The NAA may be a network access module.

In the disclosure, an "indicator" may be used to indicate any function, configuration, operation is necessary or not necessary, or may be used as a use of a corresponding function, configuration, or operation itself. Further, in the disclosure, the indicator may be expressed in various forms such as a character string, an alphanumeric string, an operator representing true/false (Boolean—TRUE or FALSE), a bitmap, an array, a flag, and the like.

Hereinafter, a method and apparatus for installing and managing an eUICC profile of the disclosure will be described with reference to FIGS. 1 to 6.

FIG. 1 illustrates a method of a terminal for connecting to a mobile communication network by using a UICC on which a fixed profile is installed according to an embodiment of the present disclosure.

As illustrated in FIG. 1, a UICC 120 may be inserted into a terminal 110. For example, the UICC 120 may be a detachable type, or may be pre-embedded in the terminal.

A fixed profile of the UICC on which the fixed profile is installed refers to that "access information" which can be used to access a specific mobile operator is fixed. For example, the access information may be a K or Ki value required to authenticate a network together with an international mobile subscriber identifier (IMSI), which is a subscriber delimiter, and the subscriber delimiter.

The terminal 110 according to various embodiments may use the UICC 120 so as to perform authentication with an authentication handling system of the mobile operator (e.g., home location register (HLR) or AuC). For example, the authentication process may be an authentication and key agreement (AKA) process. After succeeding in the authentication, the terminal may use a mobile communication service such as use of a telephone call or mobile data by using a mobile communication operator network 130 of the mobile communication system.

Figure 2:
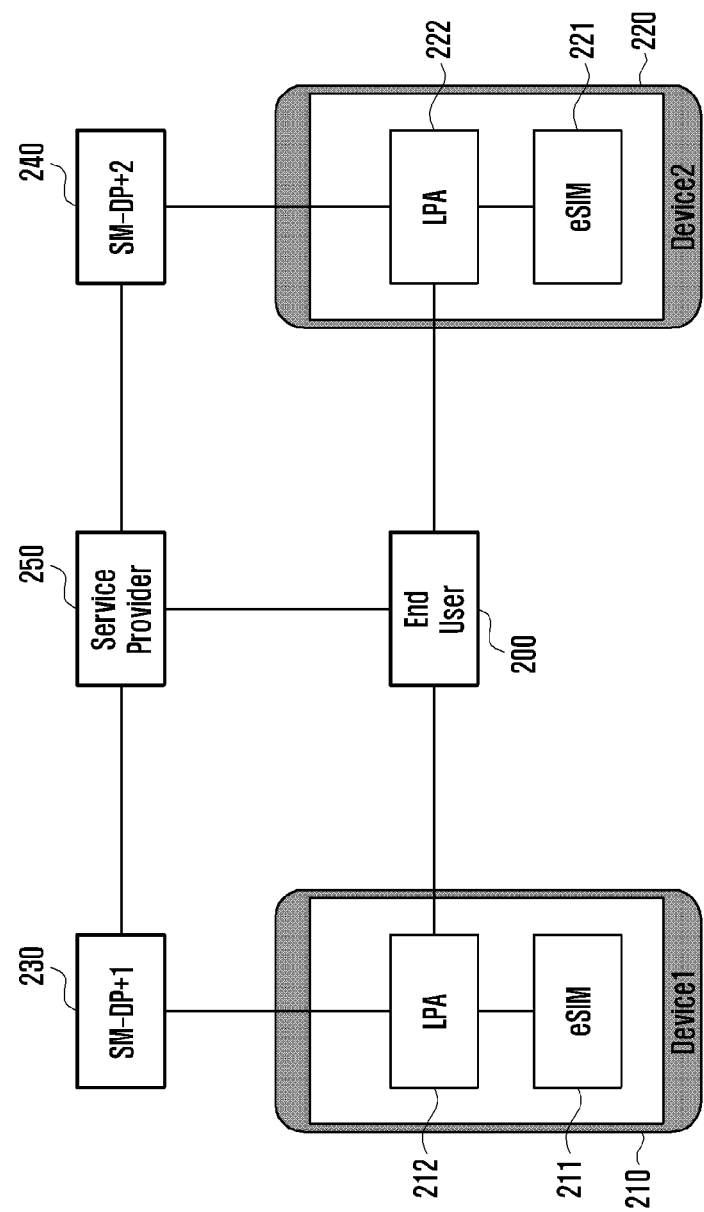
FIG. 2 illustrates a configuration of a system in which a terminal manages a profile installed in a first terminal and installs the profile in a second terminal based on a user input according to an embodiment of the present disclosure.

FIG. 2 illustrates a configuration of a system in which a terminal manages a profile installed in a first terminal and installs the profile in a second terminal based on a user input according to an embodiment of the present disclosure.

As shown in FIG. 2, terminals 210 and 220 are mounted with eSIMs 211 and 221, and a profile (not shown) may be installed in the eSIMs 211 and 221. In addition, the terminals 210 and 220 may be installed with LPA modules 212 and 222. The eSIMs 211, 221 may be subject to control of the LPA modules 212, 222. A user 200 may control a profile installed in the eSIMs 211 and 221 of each terminal through the LPA modules 212 and 222.

The user 200 may receive a communication service from a service provider (hereinafter, referred to as a "mobile operator" or "business operator") 250. To this end, a profile (not shown) of the service provider 250 may be installed in the first terminal 210. For example, when the second terminal 220 is newly purchased, the user 200 may attempt to reinstall the profile, which has been installed in the first terminal 210, in the second terminal 220.

The service provider 250 may be connected to a first profile server 230 and a second profile server 240, and the LPA 212 of the first terminal 210 may be connected to the first profile server 230, and the LPA 222 of the second terminal 220 may be connected to the second profile server 240. Here, the first profile server 230 and the second profile server 240 may be the same or different. In addition, when one or more business operator servers are included in the configuration, each business operator server may be connected to a separate profile server, and at least one business operator server may be connected to the same profile server. Although FIG. 2 illustrates a case in which each of the profile servers 230 and 240 is configured as a single server, one or more profile servers (SM_DP+) may be included in a server configuration, and one or more opening/mediation servers (SM-DS) for assisting connection generation of a specific profile server and a terminal may be included in a server configuration according to an implementation and an embodiment. It should be noted that the configuration of the various servers may be simply referred to as a single profile server.

The detailed operation and message exchange procedure of the user 200, the service provider 250, the terminals 210 and 220, the eSIMs 211 and 221, the LPAs 212 and 222, and the profile servers 230 and 240 will be described in detail with reference to the accompanying drawings.

Figure 3:
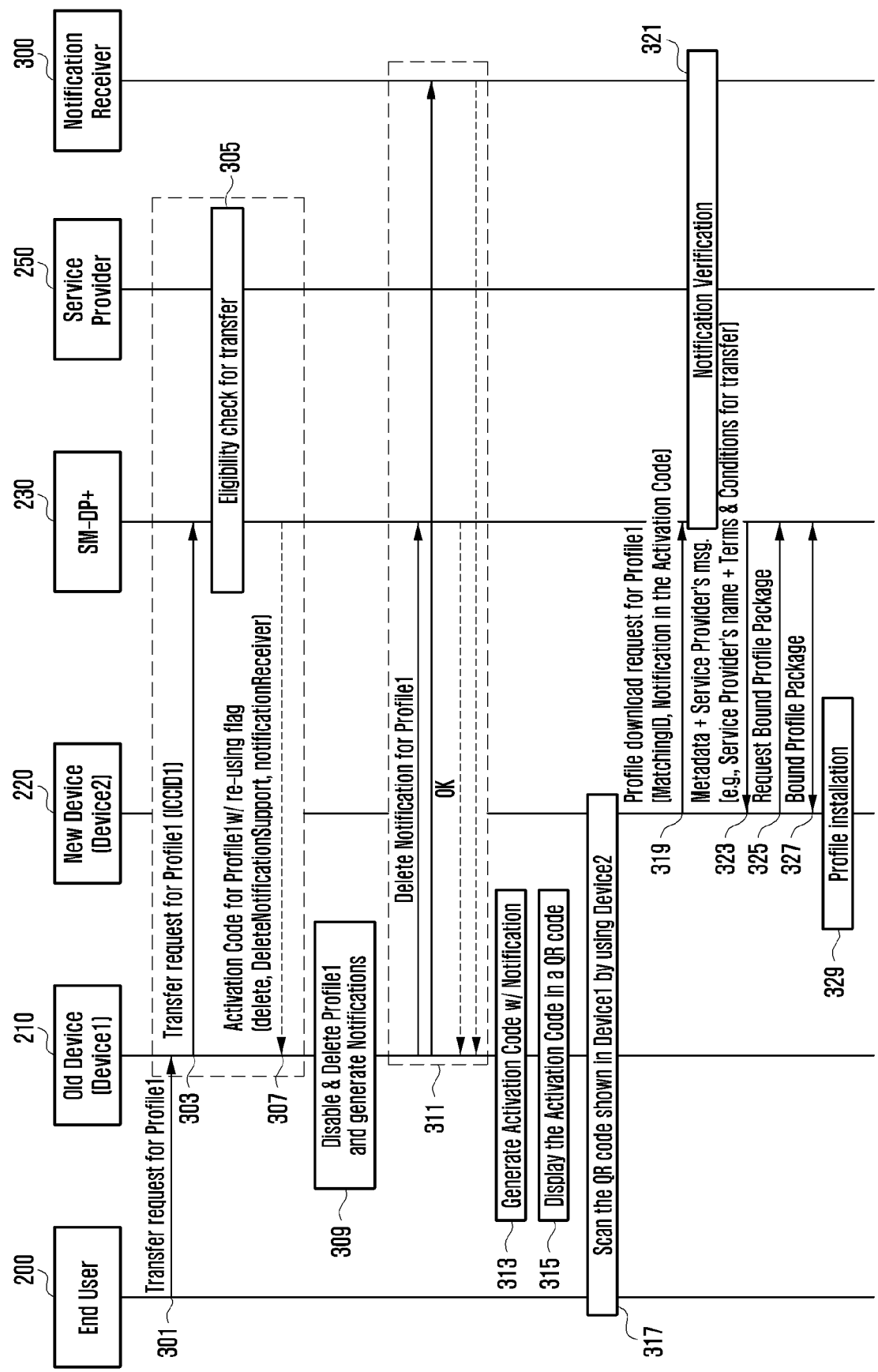
FIG. 3 illustrates a procedure in which a first terminal receives an activation code through a profile server and transmits the activation code to a second terminal for downloading a profile according to an embodiment of the present disclosure.

FIG. 3 illustrates a procedure in which a first terminal receives an activation code through a profile server and transmits the activation code to a second terminal for downloading a profile according to an embodiment of the present disclosure.

In FIG. 3, the configuration and explanation of a user 200, a first terminal 210, a second terminal 220, a profile server 230, and a service provider 250 will be described with reference to FIG. 2. For example, the user 200, the first terminal 210, the second terminal 220, the profile server 230, and the service provider 250 may correspond to the user 200, the first terminal 210, the second terminal 220, the first profile server 230, and the service provider 250 of FIG. 2, respectively. In addition, a notification receiving server (notification receiver) 300 is a server, to which a profile deletion result of the first terminal 210 may be transmitted, and may verify the profile deletion result and transmit the verification result to the service provider 250 and the profile server 230. In addition, although one notification receiver 300 is shown in FIG. 3 for convenience of the drawing, one or more notification receivers 300 may exist, like the profile server 230 and other profile servers (e.g., the second profile server of FIG. 2 or a third profile server not shown in the drawing).

Referring to FIG. 3, in operation 301, the user 200 may request a transfer of a first profile from the first terminal 210. To this end, the user 200 may identify, through the first terminal 210, information regarding the first profile (profile metadata) and information to be noted by the user who wants to transfer the first profile. The information regarding the first profile and the information to be noted by the user to transfer the first profile may be stored in the first terminal 210 to the first profile.

The information regarding the first profile may include, for example, the name, logo, profile policy, etc. of the service provider 250. The information to be noted by the user to transfer the first profile may include, for example, the remaining number of profile transfers that the service provider 250 allows or a cost for the user to pay for the profile transfer.

In addition, the first terminal 210 or the first profile may store at least one address of a profile server to which the terminal may access for a profile transfer. The profile server to which the terminal may access for the profile transfer may be, for example, the profile server 230.

In operation 303, the first terminal 210 may request a transfer of the first profile from the profile server 230. Operation 303 may be performed, for example, by using at least one of an authentication initiation message, a terminal authentication request (authenticate client) message, and a transfer request message, and/or further transmitting an operation type configured as a device change or a profile transfer. In operation 303, the procedure of requesting transfer of the first profile may include transmitting at least a profile identifier (ICCID) of the first profile.

In addition, in operation 303, the first terminal 210 may transmit a certificate that can be used for mutual authentication between the profile server 230 and the eSIM 211 mounted on the first terminal 210, and may transmit at least one of the certificates in the certificate hierarchy of the corresponding certificate in a selective manner. The certificate may be a certificate of the eSIM 211 shown in FIG. 2 mounted on the first terminal 210. In addition, in operation 303, the first terminal 210 may transmit part or all of data transmitted when the first profile is requested to be transferred, by including a digital signature generated using a private key paired with a public key included in the certificate of the eSIM 211.

In operation 305, the profile server 230 and the service provider 250 may identify the possibility of transfer of the first profile. When the first profile can be transferred to another terminal, the profile server 230 and the service provider 250 may prepare reuse of the first profile. Here, the prepared first profile may be configured to be a state in which download is not possible in order to prevent the profile from being copied. Operation 305 may be performed, for example, using at least one of a download order message, an order confirmation message, a remote management order (rpm order) message, an order release message, or a handle notification.

In operation 305, the profile server 230 and the service provider 250 may further generate or modify part or all of the information regarding the first profile (profile metadata), and/or part or all of the information to be noted by the user who wants to transfer the first profile, if necessary. The information regarding the first profile may include, for example, the name or logo, profile policy, etc. of the service provider 250. The information to be noted by the user to transfer the first profile may include, for example, the remaining number of profile transfers that the service provider 250 allows or a cost for the user to pay for the profile transfer.

In addition, the profile server 230 and the service provider 250 may further generate an activation code capable of downloading the first profile again. The activation code may include an address of a profile server 230 in which at least a first profile is stored and an event identifier (MatchingID) connected to the first profile. Although the drawing shows that the first profile is stored in the profile server 230 for convenience, the first profile may be stored in a profile server different from the profile server 230. For example, the second profile server 240 of FIG. 2 may be used to store the first profile.

In operation 305, when the first profile cannot be transferred to another terminal, the profile server 230 and the operator 250 (e.g., service provider) may prepare a new second profile. Operation 305 may be performed, for example, using at least one of a download order message, an order confirmation message, a remote management order (rpm order) message, an order release message, or a handle notification.

In operation 305, the profile server 230 and the service provider 250 may further generate or modify part or all of information regarding the first profile (profile metadata), information regarding the second profile (profile metadata), and/or information to be noted by a user who wants to transfer the first profile, if necessary. The information regarding the first profile or the information regarding the second profile may include, for example, the name or logo, profile policy, etc. of the service provider 250 which has provided each profile. The information to be noted by the user to transfer the first profile may include, for example, the remaining number of profile transfers that the service provider 250 allows or a cost for the user to pay for the profile transfer.

In addition, the first profile server 230 and the service provider 250 may further generate an activation code capable of downloading the prepared second profile. The activation code may include an address of the profile server 230 in which at least a second profile is stored and an event identifier (MatchingID) connected to the second profile. Although the drawing shows that the second profile is stored in the profile server 230 for convenience, the second profile may be stored in a profile server, which is different from the profile server 230, for example, the second profile server 240 of FIG. 2.

In addition, in operation 305, the profile server 230 may selectively store the certificate of the eSIM 211 mounted on the first terminal 210, transmitted in operation 303, and a certificate in the certificate hierarchy of the corresponding certificate. In addition, the profile server 230 may selectively store a public key of the certificate of the eSIM 211 mounted on the first terminal 210, transmitted in operation 303.

In operation 307, the profile server 230 may transmit an activation code capable of downloading a profile prepared in operation 305 to the first terminal 210, and may further notify that the first profile needs to be deleted. The method for notifying that the first profile needs to be deleted may use, for example, a method such as transmitting a first profile deletion request flag (delete profile), transmitting a first profile reuse flag (reuse profile), not transmitting a first profile do not delete flag (do not delete profile), or not transmitting a new profile use flag (new profile).

In addition, in operation 307, when a notification that the first profile needs to be deleted is further provided, the profile server may selectively notify that a first profile deletion result of the first terminal 210, the result transmitted through the second terminal 220, can be processed. A method for notifying that the first profile deletion result of the first terminal 210 transmitted through the second terminal 220 can be processed may use, for example, a method such as transmitting a profile deletion notification support flag or not transmitting a profile deletion notification not supported flag.

In addition, in operation 307, when a notification that the first profile deletion result of the first terminal 210 transmitted through the second terminal 220 can be processed is provided, the profile server may selectively include at least one address of the notification receiver 300, in which the first profile deletion result of the first terminal 210 transmitted through the second terminal 220 is to be processed. A method for notifying of the address of the notification receiver 300 may use, for example, a method such as transmitting a frequently qualified domain name (FQDN), an Internet protocol (IP) address, and a uniform resource locator (URL) of the address of the notification receiver 300. When the notification receiver 300 is the same as the profile server 230 or the profile servers 230 or 240 having stored the first profile or the second profile in operation 305, the profile server may not notify of the address of the notification receiver 300 in a selective manner.

In addition, in operation 307, the profile server 230 may further notify the first terminal 210 of information regarding the second profile (profile metadata) and/or some or all of the information to be noted by the user who downloads the profile metadata, if necessary. When the first terminal 210 further receives information regarding the second profile and/or information to be noted by the user who downloads the second profile, the first terminal 210 may output some or all of the information to the user 200 and receive a consent of the user 200.

In operation 309, the first terminal 210 may delete the first profile according to a request of the profile server 230, and may generate a deletion result, which is to be notified to at least one notification receiver (delete notification) configured in the first profile. When disabling of the first profile is required before deleting the first profile, the first terminal 210 may disable the profile, and here, the first terminal 210 may generate a disabling result, which is to be notified to at least one notification receiver configured in the first profile. The disabling result and deletion result of the first profile may include at least a profile identifier (ICCID) of the first profile. The disabling result and deletion result of the first profile may include a certificate of the eSIM 211 mounted in the first terminal 210 and a certificate in the certificate hierarchy of the corresponding certificate. In addition, the first profile disabling and deletion results may include a digital signature generated using a private key paired with a public key included in the certificate of the eSIM 211.

The operation 309 may be performed, for example, using at least one of a profile disable message (disable profile), a profile delete message (delete profile), and a notification list retrieve message (retrieve notifications list).

In operation 311, the first terminal 210 may provide a notification of the disabling and deletion results of the first profile to a server, which has a recipient address included in the disabling and deletion results generated in operation 309. Although FIG. 3 shows that the first terminal 210 notifies the profile server 230 and the notification receiver 300 of the disabling result and deletion result for the convenience of the drawing, the disabling result and deletion result may be transmitted to another profile server (e.g., the second profile server 240 shown in FIG. 2 or a third profile server not shown in the drawing), and the disabling result and deletion result may be separately transmitted.

Operation 311 may be performed using, for example, a notification handle message. In addition, when the first profile is already in a disabled state, the first terminal 210 may omit the operation of disabling the first profile and the operation of notifying the profile server 230 of the disabling result in operation 309. Each server notified of the result in operation 311 may verify the result, and may transmit the verification result to the first terminal 210, the service provider 250, the profile server 230, and another profile server which is not shown in FIG. 3.

In operation 311, the profile server 230 may identify that the first terminal 210 has deleted the first profile, and may configure the first profile or the second profile prepared in operation 305 as a downloadable state. In addition, the profile server 230 may selectively notify the first terminal 210 that the first or second profile is in a downloadable state.

In operation 313, the first terminal 210 may generate an activation code capable of downloading a profile notified of in operation 307 (a profile prepared in operation 305) and a new activation code including the deletion result of the first profile generated in operation 309, in a selective manner.

In operation 313, the first terminal 210 may generate a new activation code when the profile server 230 has notified that the deletion result of the first profile of the first terminal 210 transmitted through the second terminal 220 can be processed in operation 307. Although the profile server 230 has notified that the deletion result of the first profile of the first terminal 210 transmitted through the second terminal 220 can be processed in operation 307, when a notification of the deletion result of the first profile is successfully performed in operation 311, the first terminal 210 may selectively perform operation 313. The first terminal 210 may perform operation 313 regardless of the notification of the profile server 230 or processing of the notification of the deletion result of the first profile.

In addition, when the address of the notification receiver which may process the first profile deletion result of the first terminal 210 transmitted through the second terminal 220 is notified of in operation 307, the first terminal 210 may include, in a new activation code, a first profile deletion result in which the recipient address included therein is the same as the notified address of the notification receiver, among the first profile deletion results generated in operation 309.

In addition, although, in operation 307, the address of a notification receiver which may process the first profile deletion result of the first terminal 210 transmitted through the second terminal 220 is notified of, when there is no first profile deletion result including the same recipient address, the first terminal 210 may not generate a new activation code in operation 313.

In addition, in operation 307, when the address of a notification receiver which may process the first profile deletion result of the first terminal 210 transmitted through the second terminal 220 is not notified of, or when there is no first profile deletion result including the same recipient address although the address of the notification receiver is notified of, the first terminal 210 may include the first profile deletion result satisfying the following conditions, among the first profile deletion results generated in operation 309, in a new activation code in operation 313:

- A first profile deletion result having a small sequence number among the first profile deletion results;
- A first profile deletion result having the same recipient address as the address of the profile server 230 among the first profile deletion results;
- A first profile deletion result having the same recipient address as the address of a profile server included in an activation code from which the profile prepared in operation 305 can be downloaded, among the first profile deletion results; and/or
- A first profile deletion result which is randomly selected among the first profile deletion results.

Further, in operation 313, the first terminal 210 may include all or part of the selected first profile deletion result in a new activation code. In this case, the first terminal 210 may include, in the new activation code, only a part except for a certificate of the eSIM 211 and a certificate in the certificate hierarchy of the corresponding certificate from the transmitted first profile deletion result. In addition, the first terminal 210 may generate a delete notification for device change including the first profile deletion result excluding a certificate of the eSIM 211 and a certificate in the certificate hierarchy of the corresponding certificate, and may include the delete notification for device change in a new activation code.

In operations 315 and 317, the first terminal 210 may transmit the activation code transmitted in operation 307 or the activation code generated in operation 313 to the second terminal 220.

As an example, in which the first terminal 210 transmits the activation code to the second terminal 220, the first terminal 210 may convert the activation code into an image form such as a quick response (QR) code or into a character string form and output the same onto the screen, and may notify a user that the activation code has been prepared, in operation 315.

In operation 317, the user 200 may input the activation code output on the screen of the first terminal 210 to the second terminal 220. As a method of inputting the activation code, various methods such as capturing an image such as a QR code with a camera or inputting a character string with a keyboard may be used. In addition, when the first terminal 210 and the second terminal 220 are connected to each other through short-range communication (e.g., Bluetooth, NFC, Wi-Fi, Wi-Fi Direct, etc.), the first terminal 210 may directly transmit the activation code to the second terminal 220 without outputting the activation code to the screen in operation 315.

In operation 319, the second terminal 220 may transmit a profile download request to the profile server 230. Operation 319 may be performed using, for example, at least one of an authentication initiate message, a device authentication request (authenticate client) message, and a transfer request message. Operation 319 may include a procedure in which the second terminal 220 transmits an event identifier (MatchingID) included in the activation code to the profile server 230. In operation 319, the second terminal 220 may use Wi-Fi or an Internet tethering function provided by the first terminal 210 for Internet connection. In operation 319, when the activation code transmitted from the first terminal 210 includes the first profile deletion result, the second terminal 220 may include a procedure of transmitting the corresponding first profile deletion result to the profile server 230 in a selective manner. In operation 319, although the second terminal 220 includes a procedure of transmitting the first profile deletion result, when the profile server 230 does not support the processing of the first profile deletion result, the profile server 230 may return an error code and terminate the operation, or proceed to the next operation without returning the error code.

In operation 321, the profile server 230 may first identify whether the profile is in a downloadable state. When it is not identified that the first profile has been deleted from the first terminal through operations 309 to 311 and thus profile download is not possible, the profile server 230 returns an error code and terminates the operation. When the profile download is possible, the profile server 230 may transmit information regarding the profile and information to be noted by the user who downloads the first profile to the second terminal 220. The information regarding the profile may include, for example, the name, logo, profile policy, etc. of the service provider 250. The information to be noted by the user who downloads the profile may include, for example, the remaining number of profile transfers that the service provider 250 allows or a cost for a user to pay for the profile transfer.

In operation 321, when it is not identified that the first profile has been deleted from the first terminal through operations 309 to 311 and the profile download is not possible, the profile server 230 may identify the first profile deletion result, which is transmitted by the second terminal 220 in operation 319. In operation 313, when the first terminal 210 includes a part of the first profile deletion result, that is, only a part except for a certificate of the eSIM 211 and a certificate in the certificate hierarchy of the corresponding certificate, in the activation code, the profile server 230 may recover the first profile deletion result by combining the certificate of the eSIM 211 and the certificate in the certificate hierarchy of the corresponding certificate, which are stored in operation 305, and the transmitted first profile deletion result, so as to enable verification of the signature of the eSIM 211.

Further, in operation 321, the profile server 230 may verify the transmitted first profile deletion result or the recovered first profile deletion result. In addition, when the first terminal 210 includes the delete notification for device change in the activation code in operation 313, the profile server 230 may verify the delete notification for device change by using a certificate public key of the eSIM 211 stored in operation 305. If the recipient address of the first profile deletion result is not the address of the profile server 230, the profile server may transmit the first profile deletion result to the notification receiver 300 of the corresponding recipient address, and the notification receiver 300 may verify the first profile deletion result and return the verification result to the profile server 230.

In operation 321, when the profile server 230 fails to verify the first profile deletion result, or receives a verification error result or fails to receive a verification result from another notification receiver 300, or when the profile server 230 may not transmit the first profile deletion result to the notification receiver 300, the profile server 230 may return an error code and terminate the operation. If the verification of the first profile deletion result is successfully performed, the profile server 230 may transmit information regarding a profile (profile metadata) and information to be noted by the user who downloads the first profile to the second terminal 220. The information regarding the profile may include, for example, the name, logo, profile policy, etc. of the service provider 250. The information to be noted by the user who downloads the profile may include, for example, the remaining number of profile transfers that the service provider 250 allows or a cost for a user to pay for the profile transfer.

In operation 323, the user 200 may identify information regarding the profile and information to be noted by a user who downloads the profile, and may consent to install the profile. An operation of consenting to install the profile may include an operation of selecting "Yes/No," inputting passwords configured by the user 200, or inputting biometric information such as fingerprint or iris of the user 200.

In operation 325, the second terminal 220 may notify the profile server 230 that the user 200 has consented to download a profile, and may request a profile package therefrom.

In operation 327, the profile server 230 may transmit the profile package for the profile to the second terminal 220.

In operation 329, the second terminal 220 may install the profile by using the profile package for the profile.

Figure 4:
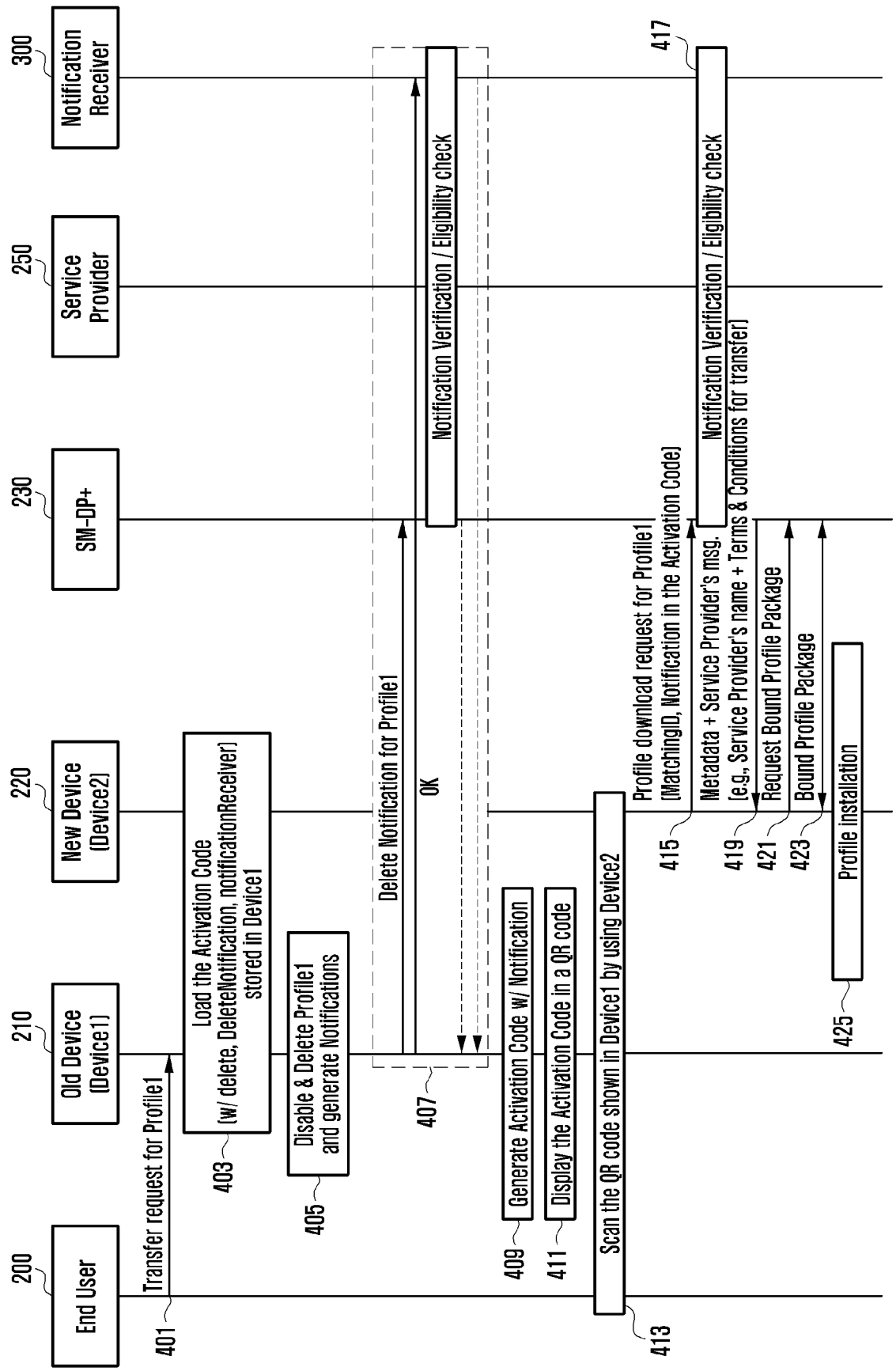
FIG. 4 illustrates a procedure in which a first terminal transmits an activation code stored in the first terminal to a second terminal for downloading a profile according to an embodiment of the present disclosure.

FIG. 4 illustrates a procedure in which a first terminal transmits an activation code stored in the first terminal to a second terminal for downloading a profile according to an embodiment of the present disclosure.

In FIG. 4, the configuration and explanation of a user 200, a first terminal 210, a second terminal 220, a profile server 230, and a service provider 250 will be described with reference to FIG. 2. For example, the user 200, the first terminal 210, the second terminal 220, the profile server 230, and the service provider 250 may correspond to the user 200, first terminal 210, the second terminal 220, the first profile server 230, and the service provider 250 of FIG. 2, respectively. In addition, the configuration and explanation of a notification receiver 300 will be described with reference to FIG. 3.

Referring to FIG. 4, in operation 401, the user 200 may request a transfer of a first profile from the first terminal 210. To this end, the user 200 may identify, through the first terminal 210, information regarding the first profile (profile metadata) and information to be noted by the user who wants to transfer the first profile. The information regarding the first profile or the information to be noted by the user to transfer the first profile may be stored in the first terminal 210 or the first profile. The information regarding the first profile may include, for example, the name, logo, profile policy, etc. of the service provider 250. The information to be noted by the user to transfer the first profile may include, for example, the remaining number of profile transfers that the service provider 250 allows or a cost for the user to pay for the profile transfer.

In addition, the first terminal 210 or the first profile may have stored an activation code that needs to be used by a terminal to perform profile transfer and information indicating that the first profile needs to be deleted for profile transfer. The activation code that needs to be used by the terminal to perform profile transfer may be, for example, an activation code used when the first profile has been installed in the first terminal in the past. Information indicating that the first profile needs to be deleted for profile transfer may be expressed using a method such as configuring a first profile delete request flag (delete profile), configuring a first profile reuse flag (reuse profile), not configuring a first profile do not delete flag (do not delete profile), or not configuring a new profile use flag (new profile), for example.

In addition, when the first terminal 210 or the first profile may have stored information indicating that the first profile needs to be deleted, information indicating that the deletion result of the first profile of the first terminal 210 can be transmitted and processed through the second terminal 220 may be stored therein. Information indicating that the deletion result of the first profile of the first terminal 210 transmitted through the second terminal 220 can be transmitted and processed through the second terminal 220 may use a method such as configuring a profile deletion notification support flag or not configuring a profile deletion notification not supported flag, for example.

In addition, when information indicating that the deletion result of the first profile of the first terminal 210 can be transmitted and processed through the second terminal 220 is configured, the first terminal 210 or the first profile may include at least one address of the notification receiver 300, which may process the deletion result of the first profile transmitted through the second terminal 220, in a selective manner. As a method for notifying of the address of the notification receiver 300, a method such as transmitting the FQDN, IP Address, and URL of the address of the notification receiver 300 may be used.

In operation 403, the first terminal 210 may read an activation code that the terminal may use to transfer the profile stored in the first terminal 210 or the first profile. The activation code may at least include the address of the profile server 230 in which the first to second profiles are stored, and an event identifier (MatchingID) connected to the first and second profiles. In this case, the first and the second profiles stored in the profile server 230 may be configured in a state in which download is not possible yet. In addition, the first terminal 210 may read information indicating that the first profile needs to be deleted, information indicating that the deletion result of the first profile of the first terminal 210 can be transmitted and processed through the second terminal 220, and the address of the notification receiver 300 which may process the deletion result of the first profile.

In operation 405, the first terminal 210 may delete the first profile, and may generate a deletion result, which is to be notified to at least one notification receiver configured in the first profile. When disabling of the first profile is required before deletion of the first profile, the first terminal 210 may disable the profile, and here, the first terminal 210 may generate a disabling result, which is to be notified to at least one notification receiver configured in the first profile. The disabling and deletion results of the first profile may include at least a profile identifier (ICCID) of the first profile. The disabling and deletion results of the first profile may include a certificate of the eSIM 211 mounted in the first terminal 210 and a certificate in the certificate hierarchy of the corresponding certificate. In addition, the first profile disabling and deletion result may include a digital signature generated using a private key paired with a public key included in the certificate of the eSIM 211. Operation 405 may be performed, for example, using at least one of a profile disable message (disable profile), a profile delete message (delete profile), and a notification list retrieve message (retrieve notifications list). Operation 405 may be performed when information indicating that the first profile needs to be deleted is stored or irrespective of the information.

In operation 407, the first terminal 210 may provide a notification of the disabling and deletion result of the first profile to a server, which has a recipient address included in the disabling and deletion result generated in operation 309. Although FIG. 4 shows that the first terminal 210 notifies the profile server 230 and the notification receiver 300 of the disabling result and deletion result for the convenience of the drawing, the disabling result and deletion result may be transmitted to another profile server (e.g., the second profile server 240 shown in FIG. 2 or a third profile server not shown in the drawing), and the disabling result and deletion result may be separately transmitted. Operation 407 may be performed using, for example, a notification handle message. In addition, when the first profile is already in a disabled state, the first terminal 210 may omit the operation of disabling the first profile and the operation of notifying the profile server 230 of the disabling result in operation 407.

In operation 407, the profile server 230 and the operator 250 may identify the possibility of transfer of the first profile. If the first profile can be transferred to another terminal, the profile server 230 and the operator 250 may prepare for reuse of the first profile. Operation 407 may be performed using at least one of a download order message, an order confirmation message, a remote management order (rpm order) message, an order release message, or notification handling.

In operation 407, the profile server 230 may identify that the first terminal 210 has deleted the first profile, and may configure the first to the second profiles as a downloadable state. In addition, the profile server 230 may notify the first terminal 210 that the first to second profiles are in a downloadable state. If the deletion of the first profile is not confirmed in operation 407, the profile server 230 may configure the first to the second profiles to be unavailable for download or may maintain the existing configuration.

In operation 409, when information indicating that the deletion result of the first profile can be transmitted and processed through the second terminal 220 is configured, the first terminal 210 may selectively generate a new activation code including the deletion result of the first profile generated in operation 405. The first terminal 210 may selectively generate a new activation code including the deletion result of the first profile generated in operation 405 irrespective of the configuration.

In operation 409, when the address of the notification receiver 300, which may process the first profile deletion result transmitted through the second terminal 220, is configured, the first terminal 210 may include, in a new activation code, a first profile deletion result in which the recipient address included therein is the same as the configured address of the notification receiver, among the first profile deletion results generated in operation 405.

In addition, in operation 409, although the address of the notification receiver 300 which may process the first profile deletion result transmitted through the second terminal 220 is configured, when there is no first profile deletion result including the same recipient address, the first terminal 210 may not generate a new activation code.

In addition, in operation 409, when the address of a notification receiver 300 which may process the first profile deletion result transmitted through the second terminal 220 is not configured, or when there is no first profile deletion result including the same recipient address although the address of the notification receiver has been configured, the first terminal 210 may include, in a new activation code, the first profile deletion result satisfying the following conditions, among the first profile deletion results generated in operation 309:

A first profile deletion result having a small sequence number among the first profile deletion results;

A first profile deletion result having the same recipient address as the address of the profile server 230 among the first profile deletion results;

A first profile deletion result having the same recipient address as the address of a profile server included in an activation code that a terminal may use to perform transfer of a profile stored in the first profile, among the first profile deletion results; and/or A first profile deletion result which is randomly selected among the first profile deletion results.

Further, in operation 409, the first terminal 210 may include all or part of the selected first profile deletion result in a new activation code. In this case, the first terminal 210 may include, in a new activation code, only a part except for the eSIM 211 certificate and a certificate in the certificate hierarchy of the corresponding certificate from the transmitted first profile deletion result. In addition, the first terminal 210 may generate a delete notification for device change including the first profile deletion result excluding the eSIM 211 certificate and a certificate in the certificate hierarchy of the corresponding certificate, and may include the delete notification for device change in a new activation code.

In operation 411, the first terminal 210 may convert the activation code into an image form such as a quick response (QR) code or into a character string form and output the same onto the screen, and may notify a user that the activation code has been prepared.

In operation 413, the user 200 may input the activation code output on the screen of the first terminal 210 to the second terminal 220. As a method of inputting the activation code, various methods such as capturing an image such as a QR code with a camera or inputting a character string with a keyboard may be used. In addition, when the first terminal 210 and the second terminal 220 are connected to each other through short-range communication (e.g., Bluetooth, NFC, Wi-Fi, Wi-Fi Direct, etc.), the first terminal 210 may directly transmit the activation code to the second terminal 220 without outputting the activation code to the screen.

In operation 415, the second terminal 220 may request download of the first to second profiles from the profile server 230. Operation 415 may be performed using, for example, at least one of an authentication initiate message, a device authentication request (authenticate client) message, and a transfer request message. Operation 415 may include a procedure in which the second terminal 220 transmits an event identifier (MatchingID) included in the activation code to the profile server 230.

In operation 415, the second terminal 220 may use Wi-Fi or an Internet tethering function provided by the first terminal 210 for Internet connection. In operation 415, when the activation code transmitted from the first terminal 210 includes the first profile deletion result, the second terminal 220 may include a procedure of transmitting the corresponding first profile deletion result to the profile server 230 in a selective manner. In operation 415, although the second terminal 220 includes a procedure of transmitting the first profile deletion result, when the profile server 230 does not support the processing of the first profile deletion result, the profile server 230 may return an error code and terminate the operation, or proceed to the next operation without returning the error code.

In operation 417, the profile server 230 may first identify whether the first profile is in a downloadable state. When it is not identified that the first profile has been deleted from the first terminal through operations 405 to 407 and thus download of the prepared first to second profiles is not possible, the profile server 230 may return an error code and terminate the operation. When the profile download is possible, the profile server 230 may transmit information regarding the profile (profile metadata) and information to be noted by the user who downloads the profile to the second terminal 220. The information regarding the profile may include, for example, the name, logo, profile policy, etc. of the service provider 250. The information to be noted by the user who downloads the profile may include, for example, the remaining number of profile transfers that the service provider 250 allows or a cost for a user to pay for the profile transfer.

In operation 417, when it is not identified that the first profile has been deleted from the first terminal through operations 405 to 407 and the profile download is not possible, the profile server 230 may identify the first profile deletion result, which is transmitted by the second terminal 220 in operation 417. In operation 417, when the first terminal 210 includes a part of the first profile deletion result, that is, only a part except for the eSIM 211 certificate and the certificate in the certificate hierarchy of the corresponding certificate, in the activation code, the profile server 230 may recover the first profile deletion result by combining a certificate of the eSIM 211 and a certificate in the certificate hierarchy of the corresponding certificate, which are stored in an operation of providing the first profile to the first terminal 210 (not shown, before operation 401), and the transmitted first profile deletion result, so as to enable verification of the signature of the eSIM 211.

Further, in operation 417, the profile server 230 may verify the transmitted first profile deletion result or the recovered first profile deletion result. In addition, in operation 409, when the first terminal 210 includes the delete notification for device change in the activation code, the profile server 230 may verify the delete notification for device change by using a certificate public key of the eSIM 211 stored in the operation of providing the first profile to the first terminal 210 (not shown, before operation 401). If the recipient address of the first profile deletion result is not the address of the profile server 230, the profile server may transmit the first profile deletion result to the notification receiver 300 of the corresponding recipient address, and the notification receiver 300 may verify the first profile deletion result and return the verification result to the profile server 230.

When the profile server 230 has failed to verify the first profile deletion result in operation 417, or has received a verification error result or has failed to receive a verification result from another notification receiver 300, or when the profile server 230 has failed to transmit the first profile deletion result to the notification receiver 300, the profile server 230 may return an error code and terminate the operation. If the verification of the first profile deletion result is successfully performed, the profile server 230 may transmit information regarding the profile (profile metadata) and information to be noted by the user who downloads the profile to the second terminal 220. The information regarding the profile may include, for example, the name, logo, profile policy, etc. of the service provider 250. The information to be noted by the user who downloads the profile may include, for example, the remaining number of profile transfers that the service provider 250 allows or a cost for a user to pay for the profile transfer.

In operation 419, the user 200 may identify information regarding the profile and information to be noted by a user who downloads the profile, and may consent to install the profile. An operation of consenting to install the profile may include an operation of selecting "Yes/No," inputting passwords configured by the user 200, or inputting biometric information such as a fingerprint or iris of the user 200.

In operation 421, the second terminal 220 may notify the profile server 230 that the user 200 has consented to download a profile, and may request a profile package therefrom.

In operation 423, the profile server 230 may transmit the profile package for the profile to the second terminal 220.

In operation 425, the second terminal 220 may install a profile by using the profile package for the profile.

Figure 5:
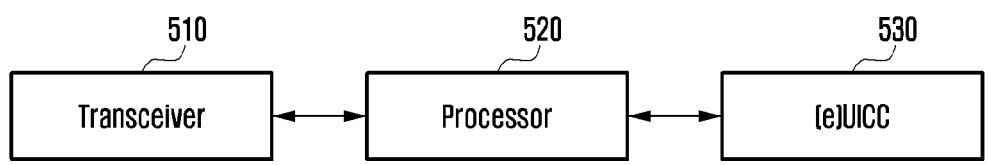
FIG. 5 is a block diagram illustrating elements of a terminal according to an embodiment of the present disclosure.

FIG. 5 is a block diagram illustrating elements of a terminal according to an embodiment of the present disclosure.

Each of the terminals (the first terminal 210, the second terminal 220, and the terminal which has been described without reference numbers) described in the disclosure may correspond to the first terminal or the second terminal described in FIG. 2. The first terminal 210 and the second terminal 220 may be one embodiment of the terminal of FIG. 2, and the expression of the "first" and "second" is only used to indicate that the respective terminals are physically different from each other.

As shown in FIG. 5, the terminal may include a transceiver 510 and a processor 520. In addition, the terminal may include an UICC 530. For example, the UICC 530 may be inserted into the terminal and may be an eUICC embedded in the terminal.

The transceiver 510 may transmit or receive a signal, information, data, etc. to or from a profile server.

The transceiver 510 according to an embodiment of the disclosure may transmit a message requesting an activation code to a profile server, receive an activation code and information indicating whether a profile deletion is required from the profile server, and transmit a profile deletion result to the profile server.

The transceiver 510 according to an embodiment of the disclosure may transmit a message requesting a profile to a profile server by using an activation code, and may receive a profile package.

On the other hand, the processor 520 is an element for overall control of the terminal. The processor 520 may control the overall operation of the terminal according to various embodiments of the disclosure. The processor 520 may be referred to as a controller. According to an embodiment of the disclosure, the processor 520 may include at least one processor.

The processor 520 according to an embodiment of the disclosure may be configured to control a terminal to receive a profile transfer request from a user, identify profile transfer information, transmit a message requesting an activation code to a profile server, receive the activation code and an information indicating whether a profile deletion is required from the profile server, delete the profile, transmit a profile deletion result to the profile server, and transmit the activation code to another terminal.

The processor 520 according to an embodiment of the disclosure may be configured to control a terminal to receive an activation code from another terminal, transmit a message requesting a profile to the profile server by using the activation code, receive a profile package from the profile server, and install the profile package.

The UICC 530 according to an embodiment of the disclosure may download a profile and install a profile. In addition, the UICC 530 may manage the profile.

The UICC 530 may operate under the control of the processor 520. The UICC 530 may include a processor or controller for installing a profile, or an application may be installed therein. A part of the application may be installed in the processor 520.

The terminal may further include a storage (not shown), and may store data such as a basic program, an application program, and configuration information for the operation of the terminal. Further, the storage may include at least one storage medium among a flash memory type memory, a hard disk type memory, a multimedia card micro type memory, a card type memory (e.g., an SD or XD memory, etc.), a magnetic memory, a magnetic disk, an optical disk, a random access memory (RAM), a static random access memory (SRAM), read-only memory (ROM), a programmable read-only memory (PROM), and an electrically erasable programmable read-only memory (EEPROM). In addition, the processor 520 may perform various operations using various programs, contents, data, etc. stored in the storage.

Figure 6:
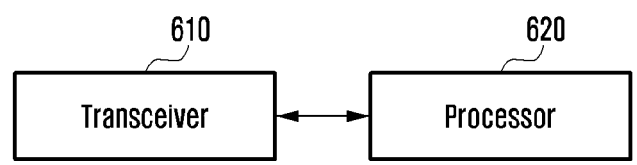
FIG. 6 is a block diagram illustrating elements of a profile server according to an embodiment of the present disclosure.

FIG. 6 is a block diagram illustrating elements of a profile server according to an embodiment of the present disclosure.

Each of profile servers (the first profile server 230, the second profile server 240, and the server which has been described without reference numbers) described in the disclosure may correspond to the profile server described in FIG. 2. The first profile server 230 and the second profile server 240 may be an embodiment of the server of FIG. 2, and the expressions "first" and "second" are only used to indicate that respective profile servers are profile servers physically different from each other.

Referring to FIG. 6, the profile server may include a transceiver 610 and a processor 620.

The transceiver 610 may transmit or receive a signal, information, data, etc. to or from a terminal or service provider.

The transceiver 610 according to an embodiment of the disclosure may be configured to receive a profile transfer request message from a terminal, transmit a message including an activation code and information indicating whether a profile deletion is required to the terminal, receive a profile deletion message from the terminal, receive a profile download request message from the terminal, transmit a profile package to the terminal when the profile is in a downloadable state, and transmit an error code when the profile is not in a downloadable state.

On the other hand, the processor 620 is an element for overall control of the profile server. The processor 620 may control the overall operation of the profile server according to various embodiments of the disclosure. The processor 620 may be referred to as a controller. According to an embodiment of the disclosure, the processor 620 may include at least one processor.

The processor 620 according to an embodiment of the disclosure may be configured to control a profile server to receive a profile transfer request message from a terminal, determine whether a profile transfer is possible, generate an activation code capable of downloading a profile, configure the profile to be in a non-downloadable state when the profile transfer is possible, configure the profile to be in a downloadable state when the profile transfer is not possible, transmit a message including an activation code and information indicating whether a profile deletion is required to the terminal, receive a profile deletion result from the terminal, change the profile to a downloadable state, receive a profile download request message from the terminal, determine whether the profile is in a downloadable state, transmit a profile package to the terminal when the profile is in a downloadable state, and transmit an error code when the profile is not in a downloadable state.

The profile server may further include a storage (not shown), and may store data such as a basic program, an application program, and configuration information for the operation of the profile server. Further, the storage may include at least one storage medium among a flash memory type memory, a hard disk type memory, a multimedia card micro type memory, a card type memory (e.g., an SD or XD memory, etc.), a magnetic memory, a magnetic disk, an optical disk, a random access memory (RAM), a static random access memory (SRAM), read-only memory (ROM), a programmable read-only memory (PROM), and an electrically erasable programmable read-only memory (EEPROM). In addition, the processor 620 may perform various operations using various programs, contents, data, etc. stored in the storage.

According to an embodiment of the disclosure, a terminal in a wireless communication system may be configured to receive a user's request to reinstall a profile, which has been installed in a terminal for network connection, in another terminal. In addition, the terminal may request an activation code for profile download from a profile server or read an activation code stored in the terminal by referring to profile transfer information stored in the terminal. In addition, the terminal may delete the profile to be transferred according to a request of the profile server or by referring to the profile transfer information stored in the terminal. In addition, the terminal may transmit the activation code, which has been received from the profile server or stored in the terminal, to another terminal through a user input, if necessary. In addition, the terminal may download the profile from the profile server by using the activation code.

According to an embodiment of the disclosure, a profile server in a wireless communication system may be configured to generate a profile for a terminal to connect to a network and an activation code required for profile download. In addition, the profile server may be configured to determine whether a profile transfer is possible, in response to a profile transfer request received from the terminal, transmit, to the terminal, a profile deletion request and an activation code capable of downloading a profile to be transferred when the profile transfer is possible, transmit, to the terminal, an activation code capable of downloading a new profile when the profile transfer is not possible, receive a deletion result of the profile to be transferred from the terminal, change the profile to be in a downloadable state, receive a profile download request from the terminal, determine whether the profile is downloadable, and transmit the profile to the terminal when the profile is downloadable.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items unless the relevant context clearly indicates otherwise. As used herein, each of such phrases as "A or B," "at least one of A and/or B," "A, B, or C," and "at least one of A, B, and/or C" may include all possible combinations of the items enumerated together in a corresponding one of the phrases. As used herein, such terms as "a first," "a second," "the first," and "the second" may be used to simply distinguish a corresponding element from another, and does not limit the elements. When an element (e.g., a first element) is referred to, with or without the term "operatively" or "communicatively," as "coupled with/to" or "connected with/to" another element (e.g., a second element), the element may be coupled/connected with/to the other element directly or via another element (e.g., a third element).

As used herein, the term "module" may include a unit implemented in hardware, software, or firmware, and may be interchangeably used with other terms, for example, "logic," "logic block," "component," or "circuit." The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., a program) including instructions that are stored in a storage medium (e.g., an internal memory or external memory) that is readable by a machine (e.g., a computer). The machine is a device that can invoke the stored instructions from the storage medium and operate according to the invoked instructions, and may include terminals according to various embodiments of the disclosure (e.g., the first terminal 210 and the second terminal 220). When the instructions are executed by a processor (e.g., the processor 520 in FIG. 9 or the processor 620 in FIG. 10), the processor may perform functions corresponding to the instructions, with or without using other components under the control of the processor. The instructions may include a code generated or executed by a complier or an interpreter.

The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Methods according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store, or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each element (e.g., a module or a program) according to various embodiments may include a single entity or multiple entities, some the above-described sub elements may be omitted, or other sub elements may be additionally included in various embodiments. Alternatively or additionally, some elements (e.g., modules or programs) may be integrated into a single entity. In such a case, the integrated entity may still perform the functions, which have been performed by each of the corresponding elements before the integration, in the same or similar manner. According to various embodiments, operations performed by the module, the program, or other elements may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first device in a communication system, the method comprising:
   identifying a selection of a profile for a device change;
   transmitting, to a server, a first message for the device change including an integrated circuit card identifier (ICCID) of the profile;
   receiving, from the server, a response message for the device change, the response message including an activation code for the device change, information indicating to delete the profile, information indicating that a delete notification for the device change is supported, and information on an address of a receiver that processes the delete notification for the device change;
   deleting the profile from an embedded universal integrated circuit card (eUICC) in the first device based on the information indicating to delete the profile; and
   transmitting, to a second device, the activation code to be used for profile download in the second device, the activation code including the delete notification for the device change.

2. The method of claim 1, further comprising:
   obtaining the delete notification for the deleted profile from the eUICC; and
   transmitting, to the receiver, a second message including the delete notification for the device change based on the information on the address of the receiver.

3. The method of claim 1,
   wherein the receiver corresponds to the server.

4. The method of claim 1,
   wherein the first message further includes information associated with a certificate of the eUICC.

5. The method of claim 1,
   wherein the delete notification for the device change includes a part of a notification for the deleted profile excluding an eUICC certificate.

6. A method performed by a server in a communication system, the method comprising:
   receiving, from a first device, a first message for device change including an integrated circuit card identifier (ICCID) of a profile;
   transmitting, to the first device, a response message for the device change,
   the response message including an activation code for the device change, information indicating to delete the profile, information indicating that a delete notification for the device change is supported, and information on an address of a receiver that processes the delete notification for the device change; and
   receiving, from a second device, a request message for profile download, the request message including the activation code including the delete notification for the device change,
   wherein the profile is downloaded from the server to the second device, based on the activation code.

7. The method of claim 6,
   wherein the first message further includes information associated with a certificate of an embedded universal integrated circuit card (eUICC) of the first device, and
   wherein the ICCID and the certificate of the eUICC are stored in the server.

8. The method of claim 7, further comprising:
   restoring a delete notification by combining the certificate of the eUICC with the delete notification for the device change; and
   performing verification for the restored delete notification based on the ICCID,
   wherein the profile is transmitted to the second device based on the verification being not failed.

9. A method performed by a second device in a communication system, the method comprising:
   receiving, from a first device, an activation code including a delete notification for a profile associated with device change;
   transmitting, to a server, a request message for profile download, the request message including the activation code including the delete notification for the device change; and
   receiving, from the server, the profile based on the activation code,
   wherein information indicating that the delete notification for the device change is supported is transmitted from the server to the first device, and
   wherein the profile is received from the server, in case that a verification performed based on the delete notification for the device change and an integrated circuit card identifier (ICCID) of the profile is not failed.

10. A first device in a communication system, the first device comprising:
    a transceiver; and
    a controller configured to:
        identify a selection of a profile for a device change,
        control the transceiver to transmit, to a server, a first message for the device change including an integrated circuit card identifier (ICCID) of the profile,
        control the transceiver to receive, from the server, a response message for the device change, the response message including an activation code for the device change, information indicating to delete the profile, information indicating that a delete notification for the device change is supported, and information on an address of a receiver that processes the delete notification for the device change,
        delete the profile from an embedded universal integrated circuit card (eUICC) in the first device based on the information indicating to delete the profile, and
        control the transceiver to transmit, to a second device, the activation code to be used for profile download in the second device, the activation code including the delete notification for the device change.

11. The first device of claim 10, wherein the controller is further configured to obtain the delete notification for the deleted profile from the eUICC, and control the transceiver to transmit, to the receiver, a second message including the delete notification for the device change based on the information on the address of the receiver.

12. The first device of claim 10, wherein the first message further includes information associated with a certificate of the eUICC.

13. The first device of claim 10, wherein the delete notification for the device change includes a part of a notification for the deleted profile excluding an eUICC certificate.

14. A server in a communication system, the server comprising:
   a transceiver; and
   a controller configured to:
      control the transceiver to receive, from a first device, a first message for device change including an integrated circuit card identifier (ICCID) of a profile,
      control the transceiver to transmit, to the first device, a response message for the device change,
      the response message including an activation code for the device change, information indicating to delete the profile, information indicating that a delete notification for the device change is supported, and information on an address of a receiver that processes the delete notification for the device change, and
      control the transceiver to receive, from a second device, a request message for profile download, the request message including the activation code including the delete notification for the device change,
   wherein the profile is downloaded from the server to the second device, based on the activation code.

15. The server of claim 14, wherein the first message further includes information associated with a certificate of an embedded universal integrated circuit card (eUICC) of the first device, and wherein the ICCID and the certificate of the eUICC are stored in the server.

16. The server of claim 15, wherein the controller is further configured to restore a delete notification by combining the certificate of the eUICC with the delete notification for the device change, and perform verification for the restored delete notification based on the ICCID, and wherein the profile is transmitted to the second device based on the verification being not failed.

17. A second device in a communication system, the second device comprising:
   a transceiver; and
   a controller configured to:
      control the transceiver to receive, from a first device, an activation code including a delete notification for a profile associated with device change,
      control the transceiver to transmit, to a server, a request message for profile download, the request message including the activation code including the delete notification for the device change, and
      control the transceiver to receive, from the server, the profile based on the activation code,
   wherein information indicating that the delete notification for the device change is supported is transmitted from the server to the first device, and
   wherein the profile is received from the server, in case that a verification performed based on the delete notification for the device change and an integrated circuit card identifier (ICCID) of the profile is not failed.

18. The method of claim 1, wherein the receiver is another server different from the server.

19. The method of claim 6, wherein the receiver corresponds to the server.

20. The method of claim 6, wherein the receiver is another server different from the server.

* * * * *